May 7, 1929.　　　　H. C. SUEKERT　　　　1,711,662
POWER STEERING MECHANISM
Filed Sept. 1, 1926　　　3 Sheets-Sheet 1
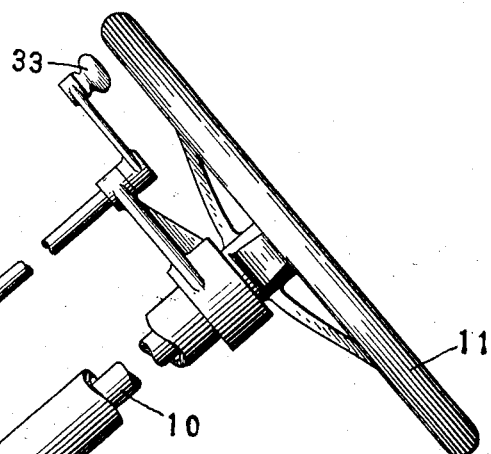
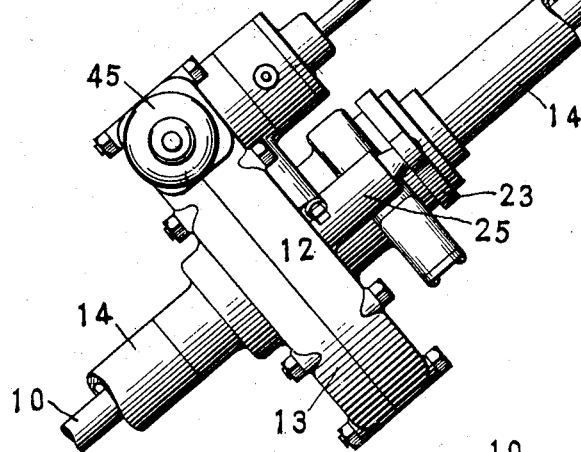
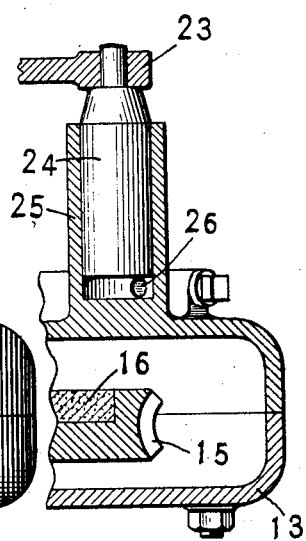
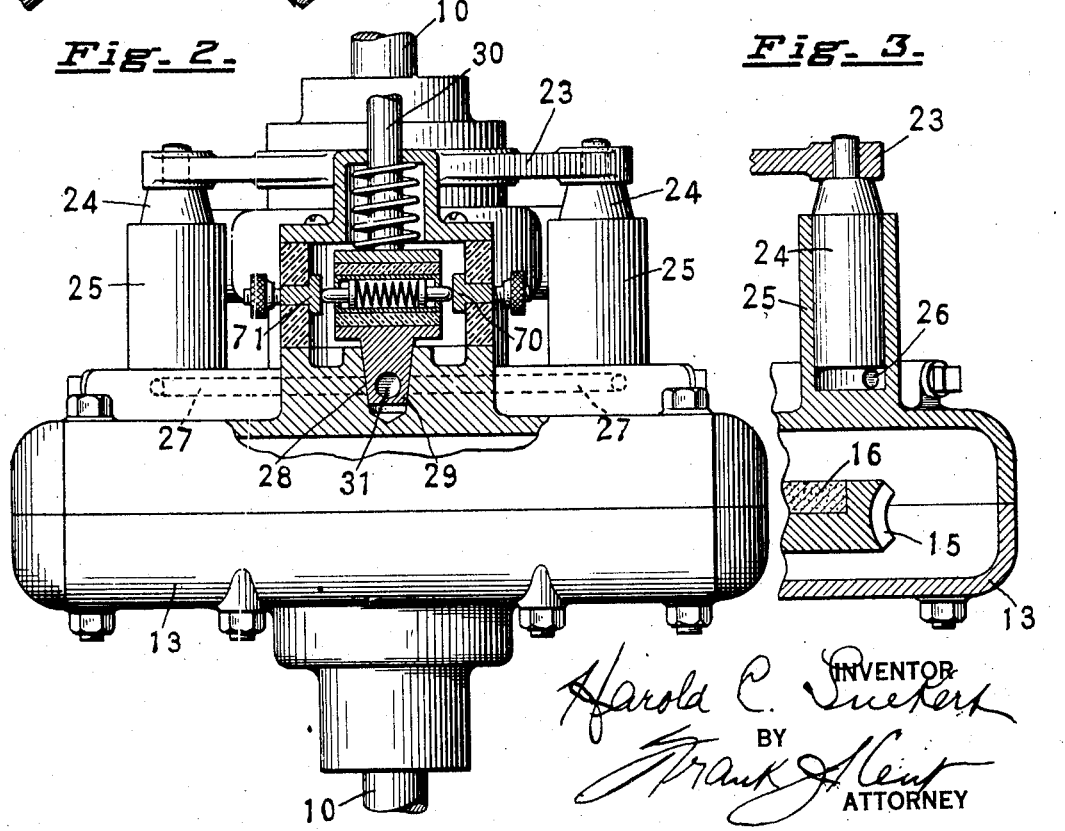

May 7, 1929.  H. C. SUEKERT  1,711,662
POWER STEERING MECHANISM
Filed Sept. 1, 1926  3 Sheets-Sheet 2
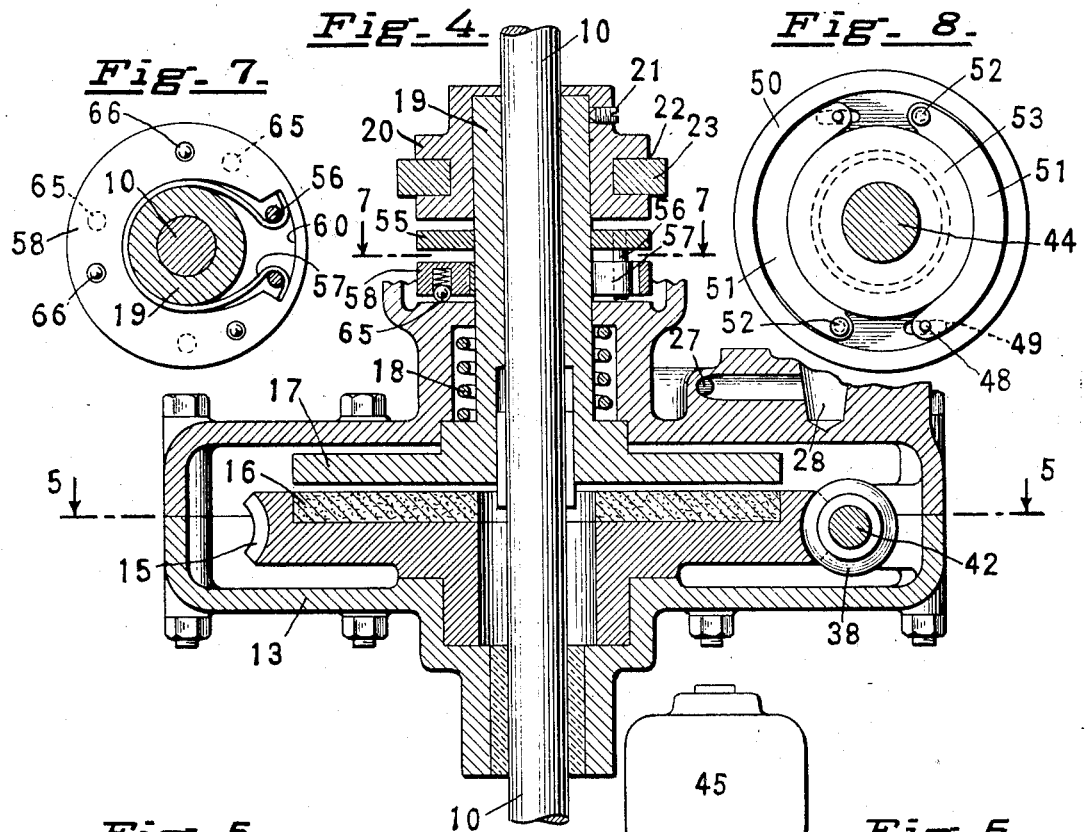
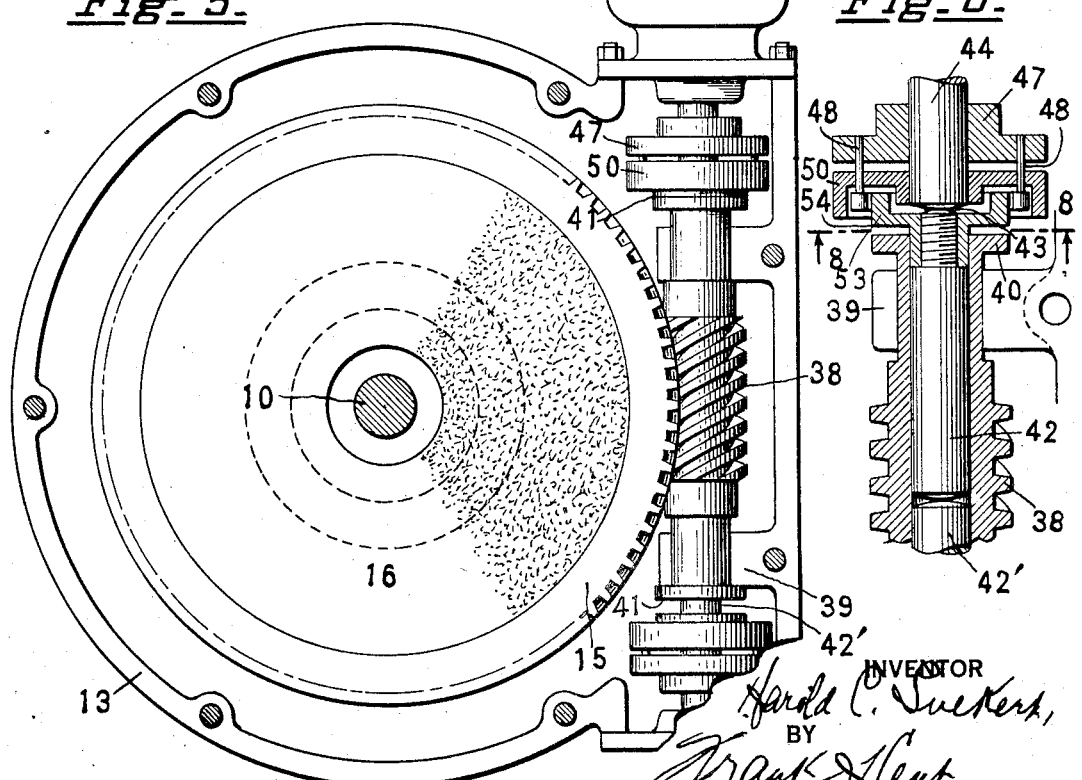
INVENTOR
Harold C. Suekert,
BY
Frank J. Hent
ATTORNEY May 7, 1929.  H. C. SUEKERT  1,711,662
POWER STEERING MECHANISM
Filed Sept. 1, 1926    3 Sheets-Sheet 3
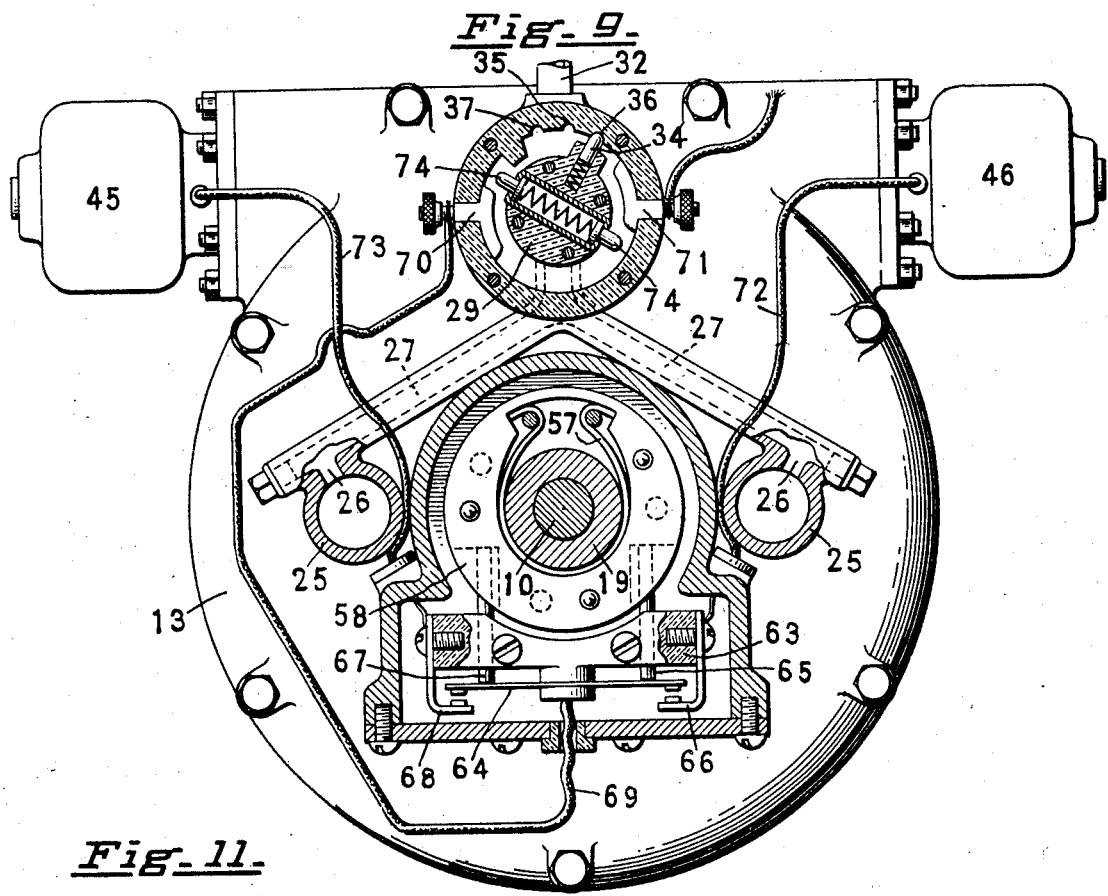
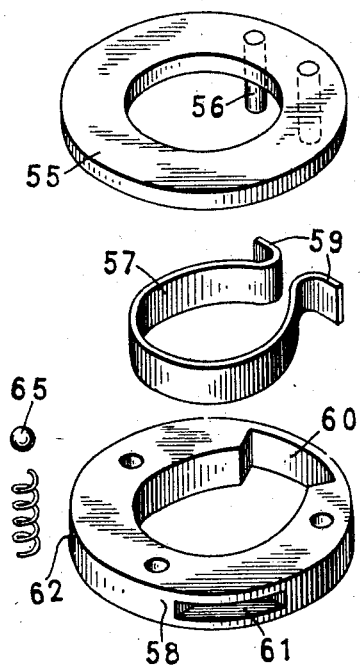
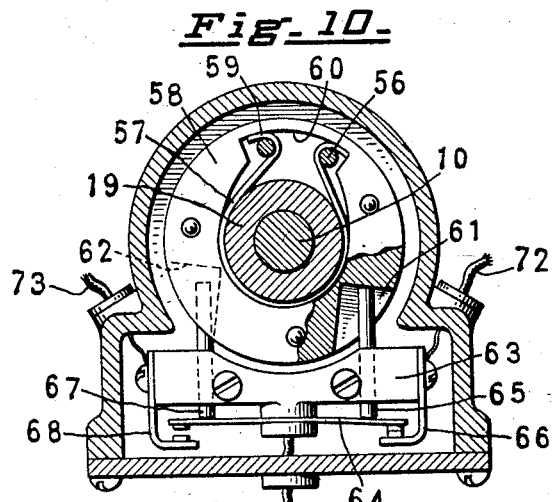

Patented May 7, 1929.

1,711,662

UNITED STATES PATENT OFFICE.

HAROLD C. SUEKERT, OF NEW YORK, N. Y., ASSIGNOR TO HIMSELF AND FRANK J. KENT, OF NEW YORK, N. Y.

POWER STEERING MECHANISM.

Application filed September 1, 1926. Serial No. 133,070.

This invention relates particularly to steering mechanism for motor vehicles and aims to produce an auxiliary power mechanism that will relieve the operator of the arduous work of steering and that will be fully responsive to every movement of the wheel.

An object of the invention is the provision of mechanism of the type referred to in which the power mechanism is entirely separate from the normal manual steering gear and is connected therewith in such a manner that failure of the power mechanism will in no way impede the operation of the manual gear.

A further aim is to provide means by which the power mechanism is brought into operation automatically at low car speeds when steering is particularly difficult, as when parking, and is automatically disconnected at higher car speeds, when steering is relatively easier. A selective manual control is provided by means of which the driver can permit the automatic clutching mechanism to operate in the manner just described or can cause the automatic clutching mechanism to become inoperative with the clutch in either engaged or disengaged position.

A feature of the invention is the arrangement of the connecting mechanism in such a way that as the steering wheel is turned there will result a progressive application of clutch pressure tending to connect the power mechanism to the steering gear as long as the steering wheel is moving in that direction, and when the wheel stops moving the clutch pressure also ceases.

The mechanism of the invention is so designed as to take advantage of the mechanical tolerance inherent in any type of steering gear. This lost motion is magnified by transmission through gears and is utilized to bring the power mechanism into play before manual power can be applied directly to the drag link.

Further objects and advantages of the invention will become apparent as the description proceeds.

While I have disclosed a preferred embodiment of the invention for purposes of illustration it should be understood that various changes may be made in the structure without departing from the spirit and scope of the invention hereinafter set forth and claimed.

In the drawings:

Fig. 1 is a side elevation of a steering mechanism embodying the present invention;

Fig. 2 is an enlarged elevation of part of the mechanism taken at right angles to Fig. 1 and showing parts broken away;

Fig. 3 is a section through one of the clutch operating pistons;

Fig. 4 is a central section through part of the steering column;

Fig. 5 is a section substantially on line 5—5 of Fig. 4;

Fig. 6 is a section showing the clutch mechanism of Fig. 5;

Fig. 7 is a section on line 7—7 of Fig. 4;

Fig. 8 is a section on line 8—8 of Fig. 6;

Fig. 9 is a section through the steering column showing the switch mechanism;

Fig. 10 is a fragmentary section showing parts of Fig. 9 in a different operative position;

Fig. 11 is an exploded view showing the parts of the switch clutch.

Referring to the drawings more particularly, the steering shaft 10, which is connected at its lower end to any type of conventional steering gear, carries at its upper end the steering wheel 11. The numeral 12 indicates generally the auxiliary power mechanism which will now be described in detail.

The casing 13 incloses the power mechanism and is secured to the outer tube 14 of the steering column. The power mechanism is adapted to be connected to shaft 10 through the clutch members shown in Fig. 4. The worm wheel 15 fits losely about the shaft 10 and is journaled in a bearing pocket formed in the lower part of the casing 13. A disc 16 of clutch material such as leather or the like is set into the upper face of the worm wheel 15. A clutch member 17 is slidably keyed to shaft 10 and a coiled spring 18 tends to press the member 17 into contact with the disc 16, in which position of parts the power mechanism is connected to the steering gear. The means for automatically and manually controlling the clutch will now be detailed.

The upper end of the clutch member 17 is prolonged into a tubular sleeve 19 surrounding the shaft, and the collet 20 is secured to the sleeve 19 by a set screw 21. An annular groove 22 is formed about the periphery of the collet 20, and the yoke 23 is rotatively fitted in the groove 22. The yoke carries lateral branches extending from opposite sides of the steering column, and a piston 24 is attached to the end of each branch and fits into a cylinder 25 formed on the upper side of casing 13. An opening 26 formed through the wall of each cylinder near the bottom thereof communicates with a passage 27 leading to a valve chamber 28. The plug valve 29, which is attached to valve stem 30 and has a port 31 formed therethrough, is adapted to open or close communication between the oil pipe 32 and the passages 27. The pipe 32 is connected to the oil pressure line of the engine of the vehicle.

When the vehicle is moving at full speed the engine is running relatively fast and the oil pressure delivered by pipe 32 to the cylinders 25 will be sufficient to raise the pistons 24 and the mechanism attached thereto, including the clutch member 17. When the vehicle runs slowly the engine speed is reduced thereby reducing the oil pressure in cylinders 25 and allowing the spring 18 to press the clutch member 17 downward into engagement with the clutch disc 16.

The valve stem 30 is prolonged to a point adjacent the steering wheel 11 and carries an operating handle 33. The upper part of the valve body carries a spring-pressed stop pin 34 engaging notches 35, 36 and 37 formed in the valve casing. When the pin is in the central notch 35, the valve is in position No. 1, illustrated in Fig. 2, and the oil pressure has free access to the cylinders to operate the clutch member 17 in correspondence to the speed of the engine as explained above. When it is desired to lock the clutch in engagement so that the power mechanism will be operative at all speeds of the engine, the engine is first slowed down to reduce the oil pressure and allow the clutch to become engaged, the valve is then moved in a counter-clockwise direction to position No. 2, in which the pin 34 engages the notch 37. The oil pressure line 32 is now cut off from the cylinders, and the spring 18 is permitted to hold the clutch in engagement continuously.

When the parts are in the position of Fig. 2 and it is desired to lock the clutch out of engagement, the motor is speeded up to cause the oil pressure to rise to the point at which the pistons 24 operate to disengage the clutch. The valve is then rotated in a clockwise direction until the pin 34 engages in notch 36. In this position, No. 3, the valve holds the oil in the cylinders 25 under pressure, thus holding the pistons 24 and the clutch member 17 in elevated position.

The outer periphery of wheel 15 is formed with teeth meshing with the worm 38, the pitch of the teeth and worm thread being such that the drive is reversible. The worm 38 is journaled in the brackets 39 and is free to move longitudinally within certain limits. Each end of worm 38 is formed with a flange 40 having an outer clutch face 41. A jack shaft extends through the worm 38 and may be formed of two separate parts 42 and 42', as illustrated, or as a single integral shaft. The jack shaft is freely rotatable within the worm, and its upper end is bevelled as at 43 and engages the bevelled end of the shaft 44 of an electric motor 45. A motor 46 is similarly mounted for co-operation with the opposite end of shaft 42, each of the motors being adapted to drive shaft 42 through a contracting shoe clutch now to be explained.

A collar 47 is keyed to the lower end of shaft 44 and carries pins 48 extending downwardly and projecting through slots 49 formed in the clutch ring 50 which is free to move relative to shaft 44. Clutch shoes 51 have their ends pivoted at 52 on the lower face of the clutch ring, the opposite ends being connected to the pins 48. A head 53 is attached to the end of shaft 42 and extends between the shoes 51, the under side of head 53 being formed with a clutch face 54 adapted to cooperate with face 41.

When the motor 45 is energized the rotation of shaft 44 will cause the pins 48 to contract the shoes 51 about the head 53, the loose mounting of the shoes upon the clutch ring 50 permitting slippage between the parts as the inertia of shaft 42 is overcome. The motor 45 is then rotating the shaft 42 in a counter-clockwise direction without causing movement of wheel 15. If the steering wheel is now turned in a counter-clockwise direction the worm 38 will be slid upward to cause engagement between the clutch faces 54 and 41, thereby causing the power from the motor to be transmitted through worm 38 to wheel 15 and thereby operate the steering gear. It should be noted that as long as the steering wheel is moved manually in a counter-clockwise direction the clutch faces 54 and 41 are passed in engagement, but as soon as pressure on the wheel is released the clutch ceases to transmit power from the motor to the worm 38. The motor shaft 44 operates at a relatively high speed while the worm gear 38 rotates at a relatively low speed, hence there will be some slippage between clutch faces 41 and 54 at all times. These differential speeds are necessary to insure the proper response from the power mechanism at all car speeds. The motor 46 is adapted to rotate the worm 38 in a clockwise direction when shaft 10 is manually moved in a clockwise direction.

The supply of current to the motors 45 and 46 is controlled by the following mechanism. A friction ring 55 is loosely mounted around the extension 19 (Fig. 4) below the collet 20 and carries a pair of depending pins 56. A yoke-shaped spring 57 fits into an annular opening in the switch block 58, the outturned ends 59 of the spring engaging opposite sides of a recess 60 formed in the block and communicating with the annular opening therein.

The switch block 58 surrounds the extension 19 below the friction ring 55 and a plurality of spring-pressed balls 65 project from recesses formed in the lower side of the block to hold it in spaced relation to the casing 13, a similar set of balls 66 separating the block from the ring 55.

Angular recesses 61 and 62 are formed in the periphery of the switch block along the side opposite the recess 60. An insulating bracket 63 is mounted opposite the switch block and has a resilient switch arm 64 secured at its middle to the center of the bracket.

A sliding pin 65 extends through the bracket 63 and into contact with the arm 64 and with the bottom of recess 61, so that when the switch block is rotated clockwise (Fig. 10) the pin 65 causes the arm 64 to contact with an arm 66 secured to the bracket. A second sliding pin 67 cooperates with the recess 62 to press the opposite side of arm 64 against the contact 68 when the switch block is rotated counter-clockwise.

A lead wire 69 is connected to the switch arm 64 and leads to a contact 70 extending through one side of the valve casing (Fig. 9). A second contact 71 extends through the opposite side of the valve casing and is connected to the battery. Leads 72 and 73 connect the contacts 66 and 68 to the motors 46 and 45 respectively, the opposite sides of the motors being grounded.

It will be clear that when the yoke 23 is held in raised position, as in Fig. 4, the collet 20 is out of contact with the friction ring 55 and hence the switch parts remain in the neutral position of Fig. 9 regardless of the rotation of steering shaft 10. But when yoke 23 is in its lowered position the collet 20 is in engagement with the friction ring and movement of the shaft will cause movement of the ring. If the shaft 10 is now turned clockwise to the position of Fig. 10 the ring 55 will turn in the same direction and the left-hand pin 56 will tighten the spring 57 about the extension 19 to cause the switch block to rotate with the part 19. This movement of the block pushes the pin 65 against arm 64, closing it against contact 66 and energizing the motor 46. Upon further clockwise rotation of shaft 10 the clutch spring will slip about the extension 19, maintaining the contact without injuring the parts. As soon as the shaft 10 is turned back the spring 57 loosens its grip and the resilient arm 64 restores the switch to the neutral position of Fig. 9. When the shaft 10 is rotated counter-clockwise the parts operate in a similar manner to actuate motor 45.

The upper part of the valve plug 29 carries opposite spring-pressed contacts 74 so arranged that when the valve is in the position of Fig. 9 with the main clutch locked in disengaged position the current is cut off from the switch 44. In the other positions of the valve the contact 74 connects the contacts 70 and 71 to send current over the lead wire 69 to the switch arm 64.

The operation of the invention may be summarized as follows: When the control valve is in the normal running position, No. 1, the oil pressure holds clutch 17 disengaged when the vehicle is moving rapidly, this position of the clutch also disengaging the clutch 55 controlling the switch block. When the vehicle is running slowly the oil pressure permits the clutch 17 to engage disc 16, thereby connecting the power mechanism to the steering shaft and also throwing in the clutch controlling the switch. When the steering wheel is turned the control switch is closed while the lost motion is being taken up and before manual power can be applied to the drag link. This operation of the switch energizes the corresponding motor and at the same time moves the worm shaft to cause the power of the motor to be applied to the steering shaft. The system of clutches and controls is so arranged that the application of power continues as long as the wheel is being turned and ceases as soon as movement of the wheel stops.

As set forth above, in position No. 2 of the valve the clutch 17 can be locked in such a position that the power mechanism will operate at all car speeds, while in position No. 3 the clutch is locked in disengaged position with current cut off from the switch block.

I claim:—

1. In a power steering gear for motor vehicles, a steering shaft, power mechanism for moving said steering shaft, a clutch for engaging the power mechanism with the steering shaft, and means responsive to the speed of the vehicle for operating the clutch.

2. In a power steering gear for motor vehicles, a steering shaft, power mechanism for moving said steering shaft, a clutch for engaging the power mechanism with the steering shaft, and means responsive to pressure in the oil line of the motor for operating the clutch.

3. In a power steering gear for motor vehicles, a steering shaft, power mechanism for moving said steering gear, a clutch for engaging the power mechanism with the steering shaft, pistons responsive to pressure in the oil line of the motor for operating the clutch, and a manual valve for controlling admission of the oil line pressure to the pistons.

4. In a power steering gear for motor vehicles, a steering shaft, electrically operated means for moving said steering shaft, a clutch for engaging the power mechanism with the steering shaft, a switch for controlling flow of current to the electrically operated means, a friction clutch for causing movement of the shaft to operate the switch, and means for simultaneously operating both of said clutches.

5. In a power steering gear for motor vehicles, a steering shaft, electrically operated means for moving said steering shaft, a switch for controlling flow of current to the electrically operated means, and a clutch for transmitting movement from the shaft to the switch, the clutch being adapted to permit slippage between the shaft and the switch, and to release the switch and permit it to move to neutral position upon reversal of movement of the shaft.

6. In a power steering gear for motor vehicles, a steering shaft, electrically operated means for moving said steering shaft, a switch for controlling flow of current to the electrically operated means, a clutch ring surrounding the shaft and adapted to be rotated thereby, a switch block surrounding the shaft and carrying a band clutch adapted to engage the shaft, and means for causing the clutch ring to operate the band clutch.

7. In a power steering mechanism for motor vehicles, a steering shaft carrying a steering wheel keyed thereto, a clutch member keyed to the shaft, a wheel rotatively surrounding the shaft and having a face cooperating with the clutch member, a worm engaging the wheel, power means for moving the worm, and a friction clutch adapted to connect the power means to the worm.

8. In a power steering mechanism for motor vehicles, a steering shaft carrying a steering wheel keyed thereto, a worm wheel adapted to be operatively connected to the shaft, a jack shaft having a head mounted on each end thereof, a power means connected to each head by a clutch, a worm engaging the worm wheel and rotatively and longitudinally movable on the jack shaft, and a clutch face formed on each end of the worm and adapted to engage the adjacent head.

9. In a power steering mechanism for motor vehicles, a steering shaft, a worm wheel adapted to be operatively connected to the shaft, a jack shaft having a head mounted on each end thereof, a power shaft in alinement with the jack shaft, a collar keyed to the power shaft, a clutch ring, a friction shoe pivoted at one end to the collar and adapted to engage one of the heads, the opposite end of the shoe being connected to a pin carried by the collar, a worm engaging the worm wheel and rotatively and longitudinally movable on the jack shaft, and a clutch face formed on each end of the worm and adapted to engage the adjacent head to cause the worm to be moved by the power shaft.

10. In a power steering mechanism for motor vehicles, a steering shaft carrying a steering wheel keyed thereto, a worm wheel adapted to be operatively connected to the shaft, a worm engaging the worm wheel, an electric motor for driving the worm, a switch operated by movement of the steering shaft for controlling flow of current to the motor, and a clutch for transmitting power from the motor to the worm upon progressive application of steering pressure to the steering wheel.

In testimony whereof I affix my signature.

HAROLD C. SUEKERT.